United States Patent [19]

Poehler et al.

[11] Patent Number: 4,666,272
[45] Date of Patent: May 19, 1987

[54] METHOD OF PROJECTING FILM FRAMES AND MICROFILM READER FOR CARRYING OUT SAME

[75] Inventors: Hermann Poehler, Ober-Morlen; Peter Dziemba, Bad Nauheim, both of Fed. Rep. of Germany

[73] Assignee: MAP Mikrofilm Apparatebau Dr. Poehler GmbH & Co. KG, Ober-Morlen, Fed. Rep. of Germany

[21] Appl. No.: 785,959

[22] Filed: Oct. 10, 1985

[30] Foreign Application Priority Data

Oct. 13, 1984 [DE] Fed. Rep. of Germany ....... 3437654

[51] Int. Cl.⁴ ............................................. G03B 23/00
[52] U.S. Cl. ...................................................... 353/25
[58] Field of Search ..................... 353/25, 26 R, 26 A, 353/27 R, 27 A, 101, 70

[56] References Cited

U.S. PATENT DOCUMENTS

| | | |
|---|---|---|
| 3,963,336 | 6/1976 | Haning et al. ..................... 353/26 A |
| 4,143,953 | 3/1979 | Rauffer ............................. 353/27 R |
| 4,163,611 | 8/1979 | Hall ..................................... 353/101 |
| 4,437,738 | 3/1984 | Headley et al. .................. 353/26 R |
| 4,443,076 | 4/1984 | Itabashi ............................. 353/101 |
| 4,456,350 | 6/1984 | Drwiega ........................... 353/27 R |
| 4,482,223 | 11/1984 | Koch et al. ....................... 353/27 A |

Primary Examiner—Charles Frankfort
Assistant Examiner—Patrick R. Scanlon
Attorney, Agent, or Firm—Wegner & Bretschneider

[57] ABSTRACT

A microfilm reader with a lens holder moved independently of a lighting unit at right angles in relation to the beam path by means of a drive unit. This renders it possible to correctly position any of a plurality of lenses arranged side by side in the lens holder in relation to the frame to be projected. Given that the lighting unit and the lens holder are capable of moving independently of each other, it is furthermore possible to shift the lighting unit into a position above the respective frame to be projected to obtain an image that is optimally illuminated.

12 Claims, 2 Drawing Figures

METHOD OF PROJECTING FILM FRAMES AND MICROFILM READER FOR CARRYING OUT SAME

BACKGROUND OF THE INVENTION

This invention relates to a method of projecting frames arranged in horizontal and vertical rows on film cards, with a film holder supporting the film card being shifted perpendicular to the beam path and with a lens holder and a lighting unit featuring at least two lenses being shifted at right angles to both the beam path and the direction of movement of the film holder. Furthermore, the invention relates to a microfilm reader designed for carrying out the above method.

When projecting frames, the film holder supporting the film card is normally moved in both coordinate directions, in order to shift the desired frame into the beam path of the lens. This renders it possible to obtain on a projection surface or a screen an image that is free of distortion and that is illuminated with a sufficient degree of uniformity. In order to render the film holder capable of being moved at right angles in relation to the beam path, the unit must, however, have a relatively large design width, which is undesired in many cases.

In order to avoid a large design width, it is common to shift the lens together with the lighting unit at right angles in relation to the beam path instead of the film holder. In this case, the lighting unit is rigidly coupled with a lens holder with which it synchronously follows the movement of the lens.

In this method the illumination of the projected frame is, however, not sufficiently uniform for many applications, and considerable difficulties occur when lenses having different focal lengths are to be used alternatively. With microfilm readers having a plurality of lenses, the latter are normally mounted pivotably, so that the lens desired for one given application can be swivelled into alignment in relation to the lighting unit.

According to U.S. Pat. No. 3,963,337, it has already become known for still projectors to shift the frame to be transilluminated parallel to the optical axis of the lens, so as to obtain an image free of distortion, with the image being above the optical axis of the lens. The lighting unit is mounted pivotably, in order to obtain uniform illumination. This arrangement of the lighting unit necessitates substantial design expenditure and has to date not been considered for microfilm readers.

SUMMARY OF THE INVENTION

The invention is based on the object of developing a method of the kind mentioned at the beginning, which renders it possible even with microfilm readers having a plurality of lenses to obtain a high degree of projection quality with low design expenditure involved. Furthermore a microfilm reader featuring a plurality of lenses is to be provided for carrying out the above method.

The object referred to first is established according to the invention in that the lighting unit is shifted in relation to the lens and in that a plurality of lenses are arranged in the lens holder side by side, with the distance between the individual lenses being constant.

This movement of the lighting unit in relation to the lens results in, above all, two possibilities of obtaining a markedly improved projection quality compared with conventional projection methods. The projection methods known to date invariably result in the brightest spot of the frame projected drifting from the image center towards the image edge when projecting a frame arranged near one edge of the film card. This entails insufficient illumination of the frames projected and an impairment of the projection quality. The method of the present invention offers the possibility of advancing the lighting unit in relation to the optical axis of the lens to such an extent that the brightest spot of the frame reaches the image center again.

Given that the lens and the lighting unit are capable of moving independently of each other, the lens desired for one given application can be shifted into the correct position in relation to the frame according to its focal length by shifting the lens holder. This obviates the need for complex swivel mechanisms for employing different lenses.

It is possible to obtain an approximately uniform illumination of the frame to be projected if the optical axis of the lighting unit intersects the line running from the center of the projection surface through the principal point of the lens at the level of the frame.

The main features of a microfilm reader such as that of the present invention are that the lighting unit is designed to be capable of moving in relation to the lens holder and that the distance between the individual lenses arranged side by side in the lens holder is constant.

A microfilm reader of this type has a very simple design and can thus be of very sturdy construction. This type of microfilm reader renders it possible to project even frames positioned in close proximity to the edge of a film card with sufficiently uniform illumination and with a high degree of definition. It is especially easy to employ different lenses by shifting the lens holder. This obviates the need for complex swivel mechanisms.

In order to obtain uniform illumination, it is necessary for the lighting unit to advance in relation to the lens. This can be achieved in various ways. In case of a microfilm reader that has only one lens, it is easier for the lighting unit to be mechanically coupled with the lens holder, making for the lighting unit to advance the lens holder.

An especially advantageous embodiment, which is above all favorable with motor-driven microfilm readers having a plurality of lenses, provides for the lighting unit and the lens holder each having its own drive unit and being designed to be capable of moving independently of each other. A microfilm reader of this type is especially sturdy, since the lighting unit and the lens holder are capable of being guided independently of each other on straight guides. This high degree of sturdiness is, above all, advantageous when changing the lamp, since with units known to date lamp change easily results in bending of functionally essential components.

For each frame the optimum position of the lighting unit in relation to the lens can be obtained automatically, when the relative movement of the lighting unit in relation to the lens holder is controlled by a computer. A computer of this type can easily take into account the different focal lengths of the lenses for determining the degree of center displacement.

Adjustment of the lens holder can be effected with especially little design expenditure involved, when the lens holder is firmly connected with a toothed belt arranged at right angles in relation to the beam path.

BRIEF DESCRIPTION OF THE DRAWINGS

The invention itself, as well as additional advantages and features thereof, will be more readily and comprehensively understood from the following detailed description of the preferred inventive embodiments, such description making reference to the appended sheets of drawings, wherein.

DETAILED DESCRIPTION OF THE PREFERRED EMBODIMENTS

Figure 1:
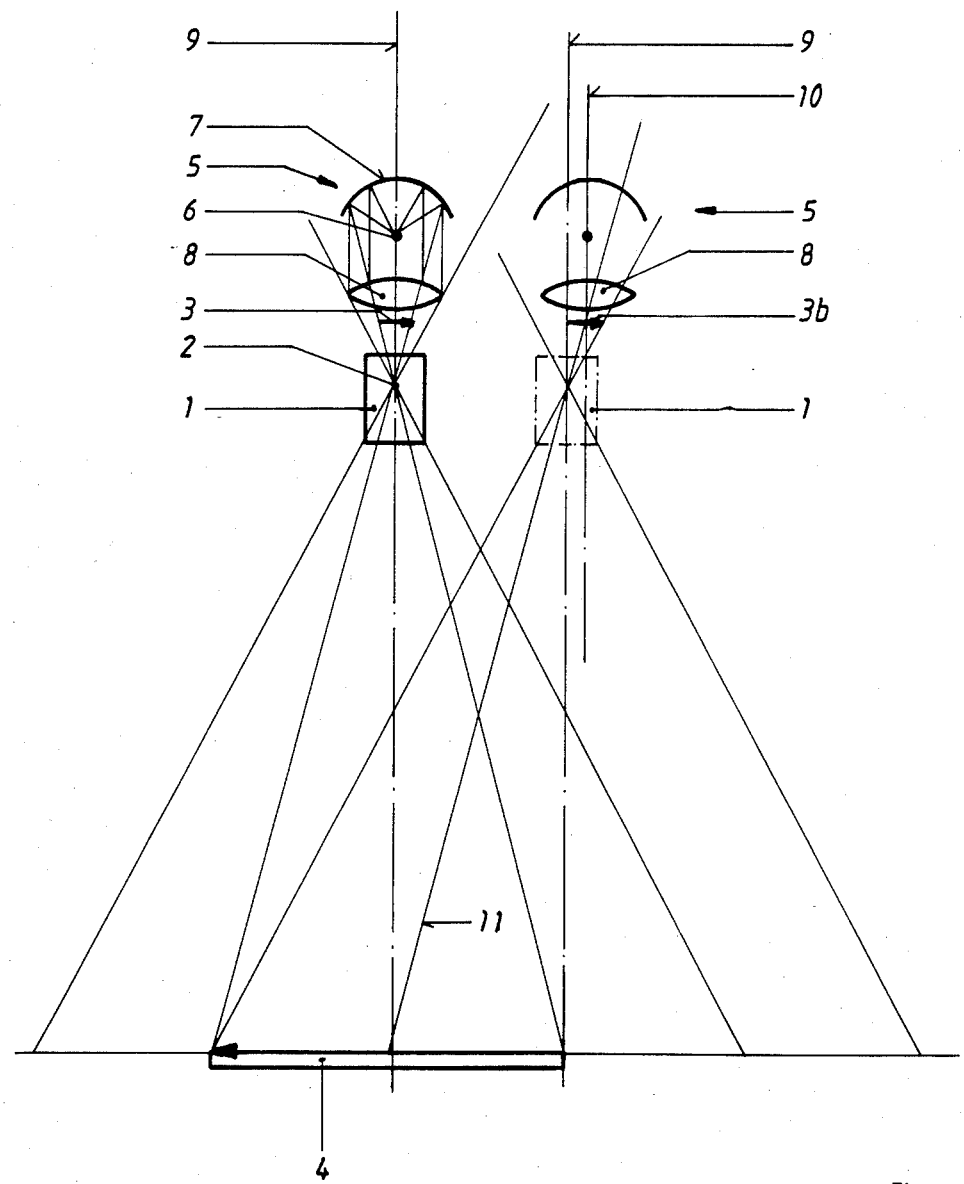
FIG. 1 is a schematic elevational view of the beam path of the projection method of the invention.

FIG. 1 schematically shows an objective lens 1 with a principal point 2, with a film frame 3 being projected onto a projection surface 4 through said lens 1. A lighting unit 5 consisting of a lamp 6, a concave mirror 7 and condenser 8 serves to trans-illuminate the film frame. Reference number 9 denotes the optical axis of the lens 1, with the former running exactly through the optical axis of the lighting unit 5, the principal point 2 of the lens 1 and the center of the projection surface 4. It is of importance to the invention that the cone of light emerging from the lens 1 spreads at such an angle that the illuminated area is substantially larger than the projection surface 4.

When a frame 3b positioned next to the frame 3 is to be projected onto the projection surface 4, the lens is shifted towards the right as seen in the drawing until the position marked with a broken line has been reachedd. Whereas in the previous position the optical axis 9 of the lens ran exactly through the center of the frame 3, it must now run along one side of the frame 3b for the frame 3b to be fully projected onto the projection surface 4 that has not changed its position. In case the lighting unit were positioned in alignment with the lens, as in the previous position, the right edge of the projection surface as seen in the drawing would be illuminated strongest. In order to obtain uniform illumination, the lighting unit 5 is shifted beyond the optical axis 9 of the lens 1 in the direction of the frame 3b, so that the optical axis 10 of the lighting unit 5 runs through the frame 3. Practical operation has shown that the optical axis 10 of the lighting unit 5 must advance in relation to the optical axis 9 of the lens to such an extent that it intersects the connecting line denoted with 11 between the center of the projection surface 4 and the principal point 2 of the lens at the level of the frame.

Figure 2:
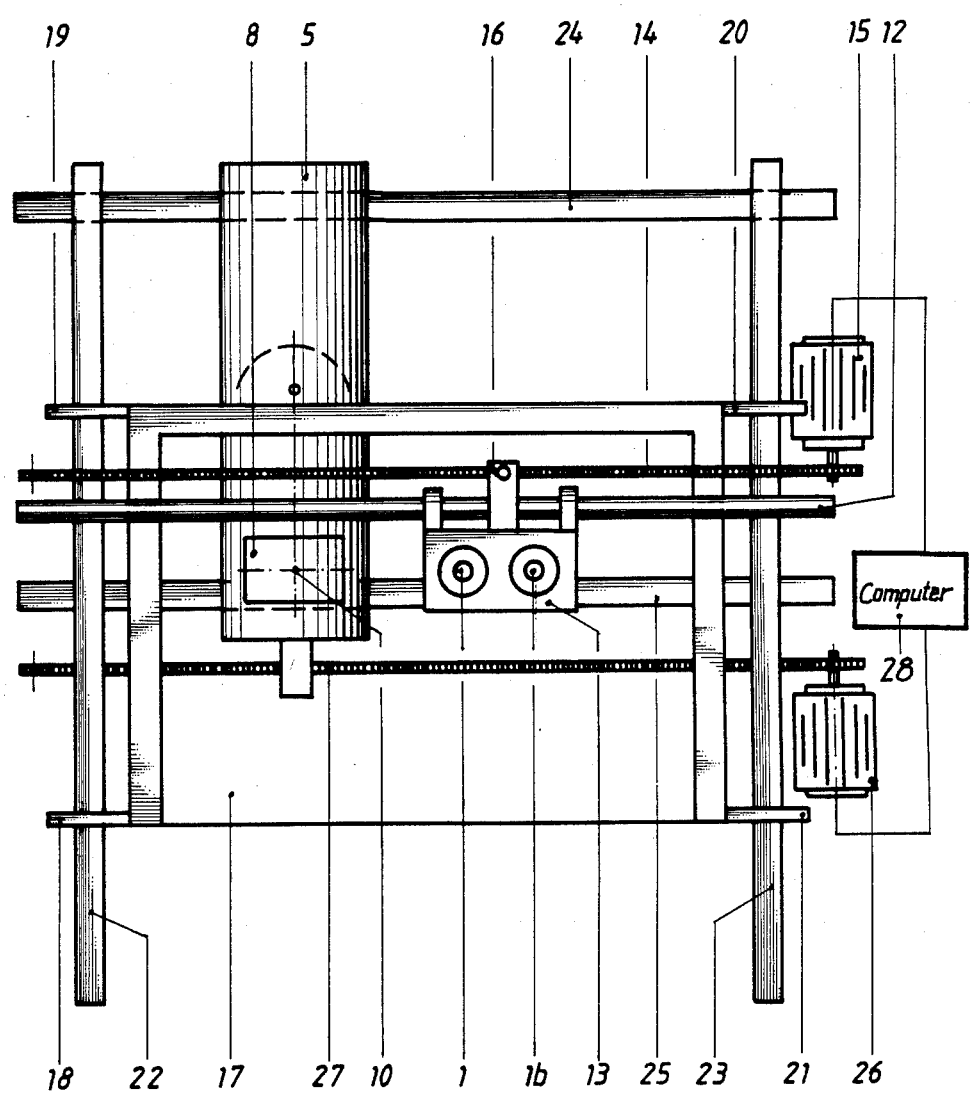
FIG. 2 is a schematic top view of components of the microfilm reader that are essential to the invention.

Reference is now made to FIG. 2 for explanation of a preferred embodiment of a microfilm reader according to the invention. FIG. 2 is a top view of a transverse guide 12 that is formed by a cylindrical rod, with a lens holder 13 being capable of moving on the former in a transverse direction. A toothed belt 14 serves to shift the lens holder 13, the belt being arranged parallel to the transverse guide 12 and being capable of being moved in a predetermined amount by a drive 15. The lens holder 13 is connected with the upper part of the toothed belt 14 by means of an arm 16, so that the lens holder 13 can be shifted by the toothed belt 14.

In the lens holder 13 two lenses 1 and 1b of different focal lengths and having a floating support are arranged side by side, so that they are capable of sliding on the upper glass plate of a film holder 17. The film holder 17 is arranged on longitudinal guides 22 and 23 which are aligned parallel in relation to each other and on which the film holder 17 can slide through guiding elements 18, 19, 20, and 21. The lighting unit 5 which can be moved independently of the lens holder 13 on two separate transverse guides 24 and 25 is positioned below the film holder 17. For this purpose a drive unit 26 is capable of driving a second toothed belt 27, the upper part of which is connected with the lighting unit 5. Through this provision the lighting unit 5 is capable of being moved by the drive unit 26, and the lens holder 13 is capable of being moved independently by the drive unit 15.

When using the microfilm reader partially represented in the drawing, one of the lenses 1 or 1b, respectively, is positioned above the condenser 8 of the lighting unit 5 either in exact alignment with the optical axis 10 of the lighting unit 5, with the latter in a central position, or laterally displaced as a function of the increasingly lateral position of the lighting unit 5. In one preferred embodiment of the invention, a computer 28 controls the driving units 15 and 26, so as to progrress the lighting unit 5 and lens holder 13 in proper relation to each other.

It should now be apparent that the objects initially set forth at the outset to this specification have bveen successfully achieved. Moreover, while there is shown and described present preferred embodiments of the invention, it is to be distinctly understood that the invention is not limited thereto, but may be otherwise variously embodied and practiced within the scope of the following claims.

What is claimed is:

1. A method of projecting frames arranged in horizontal and vertical rows on film cards onto a projection surface in a microfilm reader having a lens holder with at least two lenses mounted side by side therein, a lighting unit projecting a beam through one of said lenses, and a film holder disposed between said lens holder and said lighting unit, said method comprising shifting said film holder in a first direction perpendicular to the beam, shifting said lens holder in a second direction which is perpendicular to the first direction and to the beam, and advancing the lighting unit in the second direction in relation to the lens holder.

2. A method as claimed in claim 1, wherein the lighting unit is advanced in relation to the respective lens being employed and the lens being employed is thereby caused to advance in response thereto.

3. A method as claimed in claim 1, wherein the lighting unit is advanced and the lens holder is shifted so that the optical axis of the lighting unit intersects a line running from the center of the projection surface through the principal point of the respective lens being employed at the level of a frame being projected.

4. A method as claimed in claim 2, wherein the lighting unit is advanced and the lens holder is shifted so that the optical axis of the lighting unit intersects a line running from the center of the projection surface through the principal point of the respective lens being employed at the level of a frame being projected.

5. A microfilm reader for projecting frames onto a projection surface comprising a lens holder with at least two lenses mounted side by side therein, a lighting unit for projecting a beam through one of said lenses, and a film holder disposed between said lens holder and said lighting unit, said film holder being movable in a first direction perpendicular to the beam, said lens holder being movable in a second direction perpendicular to the first direction and to the beam, said lighting unit being movable in the second direction in relation to the lens holder.

6. A microfilm reader as claimed in claim 5, wherein said at least two lenses are mounted at a constant distance between each other.

7. A microfilm reader as claimed in claim 5, wherein the lens holder is advanced responsive to movement of the lighting unit.

8. A microfilm reader as claimed in claim 5, further comprising a separate drive means for the lighting unit and the lens holder, said lighting unit and said lens holder being capable of traveling independently of each other.

9. A microfilm reader as claimed in claim 5, wherein the relative movement of the lighting unit and the lens holder in the second direction is controlled by a computer.

10. A microfilm reader as claimed in claim 5, further comprising a guide which guides the lens holder in the second direction and a drive means which moves the lens holder in said second direction.

11. A microfilm reader as claimed in claim 10, wherein the drive means comprises a toothed belt running in the second direction.

12. A microfilm reader as claimed in claim 5, wherein the lighting unit and the lens holder are movable so that the optical axis of the lighting unit intersects a line running from the center of the projection surface through the respective lens being employed at the level of the frame being projected.

* * * * *